United States Patent [19]
Bradshaw et al.
[11] Patent Number: 4,606,660
[45] Date of Patent: Aug. 19, 1986

[54] PRINTER KIT FOR LETTER SORTING MACHINES

[75] Inventors: Robert S. Bradshaw; S. James Lazzarotti, both of Broomall; Paul E. Tartar, Chester; Richard D. Hermes, Downingtown, all of Pa.

[73] Assignee: System Development Corporation, Camarillo, Calif.

[21] Appl. No.: 630,253

[22] Filed: Jul. 12, 1984

[51] Int. Cl.[4] ........................... B41J 5/08; B07C 3/18; G06K 1/00; G06K 5/00

[52] U.S. Cl. .................................. 400/62; 101/93.04; 209/3.1; 209/584; 209/900; 400/104

[58] Field of Search ................................. 209/3.1-3.3, 209/563-566, 569, 583, 584, 900; 101/2, 93.04; 235/437, 438; 364/146, 189, 523, 419; 400/62, 103-105; 414/134, 136

[56] References Cited

U.S. PATENT DOCUMENTS 2,912,925 11/1959 Rabinow ................................ 101/2
3,136,424 6/1964 Silverschotz .................. 209/900 X
3,219,204 11/1965 Sassen et al. ....................... 414/134
3,246,751 4/1966 Brenner et al. ................ 209/900 X
3,309,711 3/1967 Sorrells et al. ................. 414/134 X
3,368,672 2/1968 Heaney et al. .................. 414/134 X
3,977,533 8/1976 Hills et al. ....................... 400/104 X
4,068,212 1/1978 Templeton ............................ 382/57
4,307,293 12/1981 Lazzarotti et al. ............ 209/584 X

*Primary Examiner*—Randolph A. Reese
*Assistant Examiner*—Edward M. Wacyra
*Attorney, Agent, or Firm*—Francis A. Varallo; Kevin R. Peterson

[57] ABSTRACT

A printer system is configured as a kit for retrofitting the input consoles of existing letter sorting machines of the type used by the U.S. Postal Service. Such machines require that an operator, stationed at a console, enter sorting information for each mail piece, by way of a manually actuated keyboard. The present invention expands the processing capabilities of the machines by imprinting machine-readable, coded information on the respective faces of the mail pieces simultaneously with the sorting thereof. At the same time, the printing function does not impair or modify the usual operator-controlled console when mail is processed which does not require such coding.

10 Claims, 6 Drawing Figures

Fig.4B
Fig.4
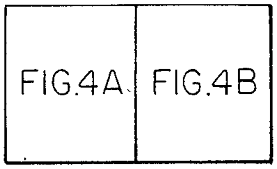
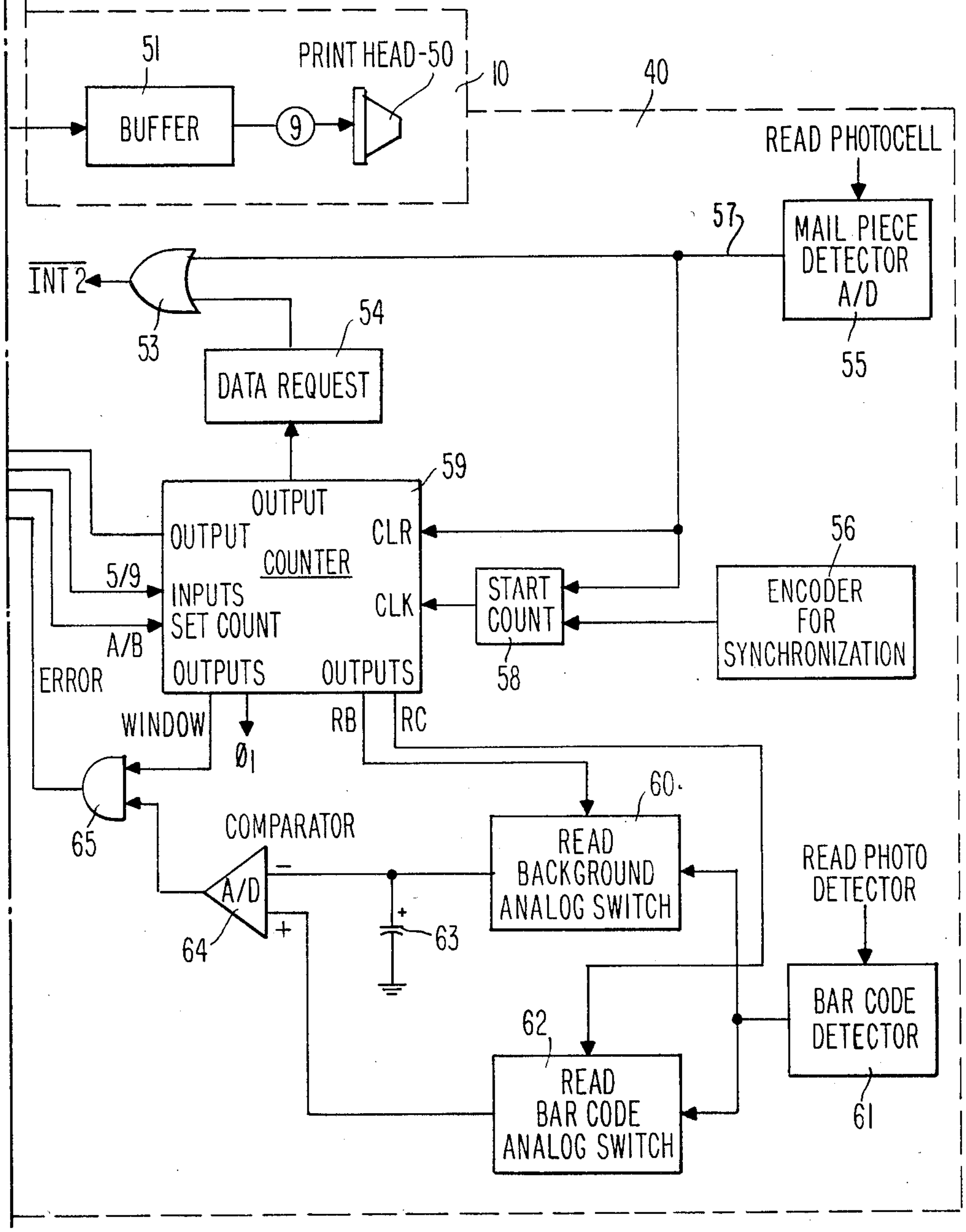

PRINTER KIT FOR LETTER SORTING MACHINES

BACKGROUND OF THE INVENTION

The U.S. Postal Service has approximately 800 multiple-position letter sorting machines, MPLSM's, such as the Series Nos. 120 and 140, in use in postal facilities throughout the United States. Each sorting machine includes 12 operator-manned coding consoles which serve as input devices for the delivery of mail into the MPLSM for the sortation and distribution thereof to any of 277 destination receptacles. Each letter must pass before an operator who reads the address and enters certain address information into the machine via a keyboard while the mail piece is automatically deposited in a letter-conveying cart compartment. The cart and the address data in memory are then instrumental in the delivery of the mail piece to its designated receptacle.

It has been observed that the flexibility and utility of letter sorting machines might be extended if they could be provided with the ability to automatically print the address information pre-coded in machine readable form on the face of the mail piece. The consoles would serve as document handling input devices having an automatic print capability. However, this automation would only be beneficial if it did not impair or modify existing operator-controlled console operation when the processing does not entail the bar-coding of letter mail.

The present invention meets the foregoing criteria in providing for the conversion of the MPLSM's to increase their processing capabilities.

SUMMARY OF THE INVENTION

In accordance with the present invention, a letter sorting machine of improved utility and flexibility is provided. Basically, this is achieved through the incorporation of a print station into the input console of the machine and the provision of an electrical interface to permit the MPLSM to accept either the manually-inputted keyboard information or the information derived from the printer interface.

Structurally, the print station is conveniently located on the input console adjacent the normal viewing area associated with the operator keyboard entry. The mail piece is advanced past the viewing area and is conveyed through the print station.

Electrically, the current letter sorting machine utilizes a device known as an "Expanded ZIP Retrofit" to automatically direct mail to its proper bin designation. The present invention provides an electrical interface, designated hereinafter as a "Console Code Printer Interface" which accepts manual keyboard data and through the application of circuit logic provides output data in the format utilized by the manual keyboard. In this way, no modification of the "Expanded ZIP Retrofit" portion of the machine is required to shift from manual to automatic operation, or vice versa.

The present invention comprises, in effect, a retrofittable console printer kit for use on the input consoles of letter sorting machines. A number of advantages accrue to the letter sorting operation through the application of the invention. For example, bar coding of the mail online permits continued utilization of the large depth of sort inherent in the MPLSM. The bar coding can take place as part of the mail sorting process. The result is the mail is both sorted and coded in one step. Additionally, the mail is sorted to the keyed data and not the coded data; failure to encode will not interfere with the sortation in process. Also, the on-line approach eliminates mail handling necessary to and from off-line coding consoles. As to cost efficiency, the modification to the console is comparatively low-cost with a very favorable price performance advantage over an off-line console. Moreover, it provides a capability without a requirement for additional floor space, and it utilizes in-place and capitalized equipment.

As mentioned hereinbefore, the multiple-position letter sorting machine includes 12 operator-manned input consoles. In utilizing the invention, any desired number of the consoles may at any time be programmed to serve as automatic print stations. This arrangement permits selection of a desired number of consoles to be used for automatic print stations in combination with the remaining operator-attended consoles at which no bar-coded address information is to be printed. In this manner, the letter sorting machine can be tailored to simultaneously sort both types of mail, and in any desired proportion.

Other features and advantages of the console printer system of the present invention will become apparent in the detailed description which follows.

DESCRIPTION OF THE PREFERRED EMBODIMENT

Figure 1:
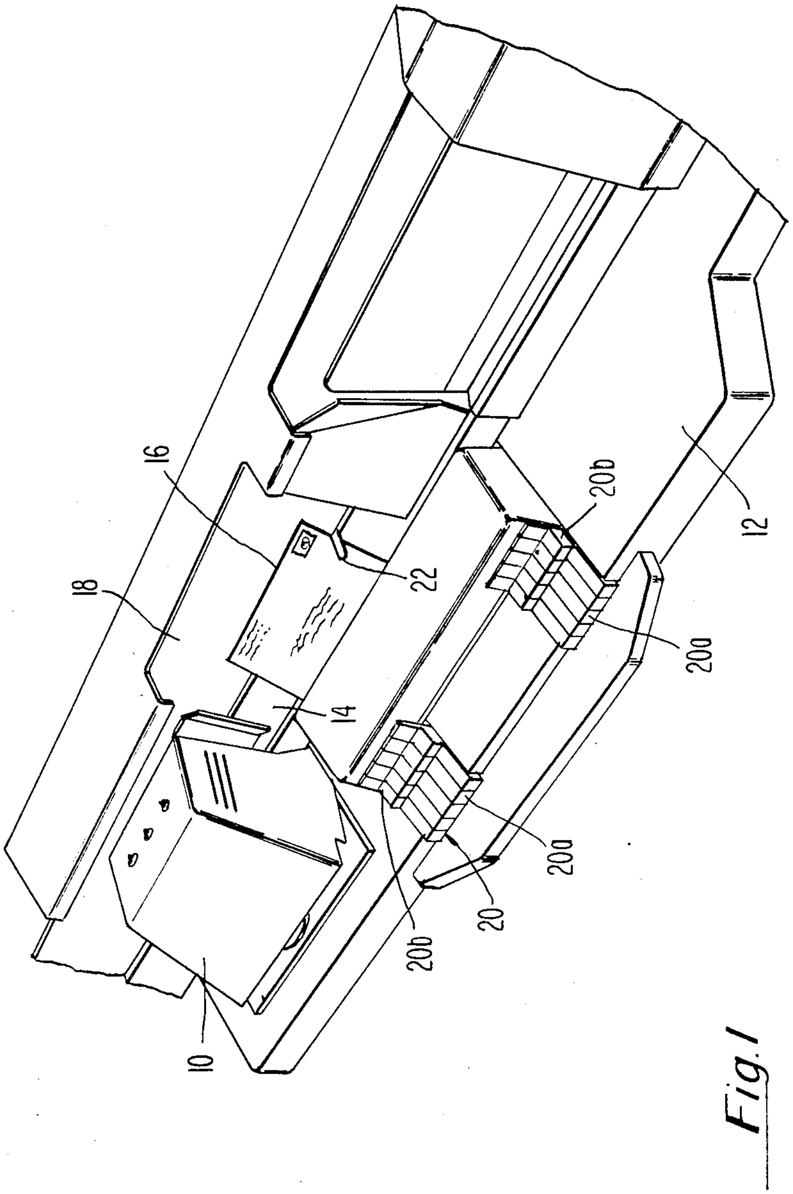
FIG. 1 is a pictorial view of the input console of a present day letter sorting machine modified to include a console printer station as contemplated by the present invention.

FIG. 1 illustrates the physical relationship of a code printer 10 to the existing elements of the input console 12 of the MPLSM.

To implement the automated mode, conventional transport rollers (not shown), driven from existing power sources within the console, and associated spring-loaded pinch rollers (not shown) are combined with elevation adjustments in the letter trough 14 to insure that the document 16 is front face registered against the printer platen within the code printer 10, as it is transported therethrough. Briefly, in operation, a letter 16 is delivered by transport means (not shown) to the viewing area 18 where it is momentarily at rest and may be examined by an operator, who then enters its destination into the console 12 via keyboard 20. Subsequently, a pusher finger 22 actuated by a second transport means (not shown) engages and accelerates the trailing edge of the letter. In the absence of the print station 10, the last mentioned transport means would continue to move the letter along its normal conveyance path. However, with the addition of the print station, the aforementioned rollers engage the mail piece and move it at a substantially uniform velocity corresponding to that of the pusher finger 22. It is apparent that the finger continues to move along with the letter 16 but is relieved of its document pushing function. As the document leaves the print station transport rollers, the conveying of the mail piece along its usual path in the console is again resumed by the pusher finger 22.

Figure 2:
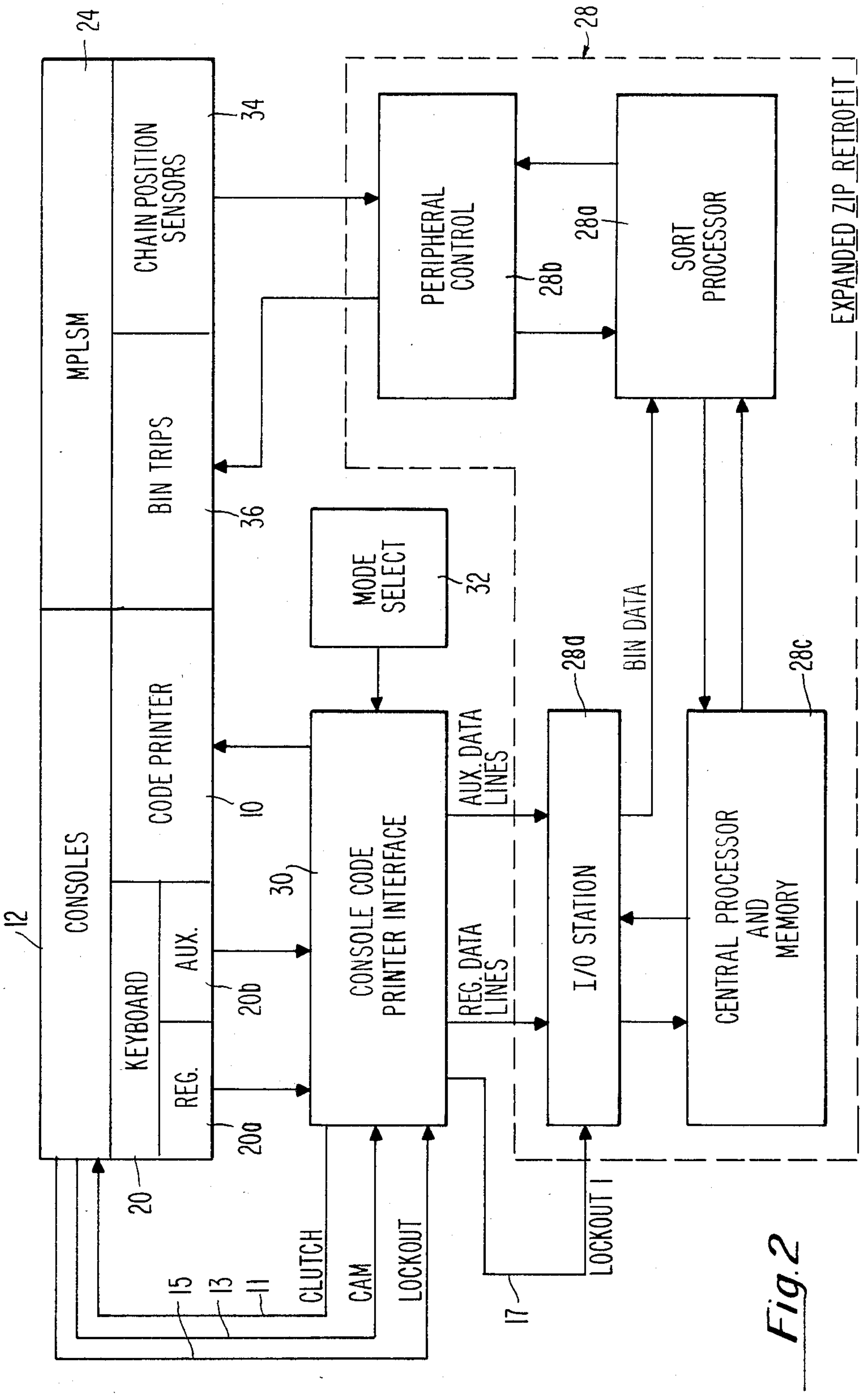
FIG. 2 is a block diagram of the principal portions of a letter sorting machine adapted in accordance with the present invention to accept address data from keyboard initiated data and convert the latter to bar code print and Expanded ZIP Retrofit data.

In FIG. 2, there is illustrated in simplified form the block diagram of a letter sorting machine 24 capable of accepting both manual keyboard and code controlled data, the latter being provided by the console printer kit of the present invention.

In FIG. 2, the existing MPLSM 24 and its accompanying input consoles 12 include Expanded ZIP Retrofit (EZR) 28 comprised of a Peripheral Control 28*b*, Sort Processor 28*a*, Central Processor and Memory 28*c* and I/O Station 28*d*. The Expanded ZIP Retrofit (EZR) 28 automatically directs mail to its proper bin destination. Destination data for each mail piece is presently supplied to the EZR 28 from the regular or auxiliary sections of the Console Keyboard 20. In accordance with the invention, a Bar Code Printer 10, as illustrated in FIG. 1, is added to console 12 and a Console Code Printer (CCP) Interface 30 is interposed between the console 12 and the I/O Station 28*d* of EZR 28. The Console Code Printer Interface 30 accepts keyed data from keyboard 20 which consists of a regular section 20*a* and an auxiliary section 20*b*, each of which contain ten keys, as seen in FIG. 1. The Mode Select unit 32 is coupled to the CCP Interface 30 which controls three modes of console printer operation: Manual Select (No Printing) Automatic Select (Machine-Paced Printing), and Automatic Select (Operator-Paced Printing). Functionally, the present EZR 28 accepts keyed ZIP code data from keyboard 20. The Central Processor and Memory 28*c* translates the data into a bin designation which it supplies to the Sort Processor 28*a* via the I/O station 28*d*. The Sort Processor 28*a* via its Peripheral Control 28*b*, makes use of chain position sensors 34 in the MPLSM 24 to electronically track the mail carts used in the system, and actuate the bin trip devices 36 to release a mail piece when it arrives at the proper sort bin.

With continued reference to FIG. 2, it is believed helpful to review the nature of the input data supplied to the EZR 28 from the keyboard 20. The Console Code Printer Interface 30 is described in detail hereinafter in connection with FIGS. 3 and 4. The CCP Interface 30 modification is designed around the present keyboard 20 to permit continued use of the keyboard in its present mode and thereby permit selection through Mode Select 32 for a printing or not printing operation—at the user's option. The Main Processor and Memory 42 (FIG. 3) provides the keyboard 20 with additional flexibility for various types of bar code printing. There are two basic bar code printing schemes. One scheme, "Operator Paced", accepts both 5 digit and 9 digit keyboard entries and is asynchronous to the MPLSM 24. The second scheme, "Machine Paced", accepts various combinations of 2 to 4 digit keyboard entries and is synchronous with the MPLSM. The present operation of the MPLSM allows 2 to 3 keystroke entries. The 3 keystroke maximum limit is based upon mail moving past the console operator at 1 letter/second. Therefore a typical operator has time only to hit 3 keys/second. A five digit ZIP code, for example, "19335" can be represented by three keystrokes. The first digits "193" of the ZIP code represent one single auxiliary 20*b* keystroke and the regular keyboard 20*a* is used to input the other two digits, "35". The "5/9 Operator Paced" bar code printing mode allows for encoding intermixed 5 digit and 9 digit ZIP coded mail. This operation assumes six keystrokes for 5 digit and ten keystrokes for 9 digit ZIP codes—the extra keystroke in the latter being for the advance key. Operating under the "5/9 Operator Paced" mode requires the mechanical drive train of the console 12 to be modified by adding a clutch, controlled by Main Processor 42 via line 11. The clutch allows a mail piece to remain in front of the operator until the keystrokes for 5 digit or 9 digit ZIP code have been completed. The clutch is engaged upon the actuation of the advance key. With additional reference to FIG. 3, electrical timing signals for synchronization are provided by a cam signal, line 13 coupled to Main Processor 42. The lockout pulse, line 15 generated by the MPLSM console 12 latches data going to EZR 28 from the Data Path Controller 44. Since the lockout pulse occurs once a second and keystroke entry for the 5/9 mode may take two to four seconds, the Main Processor 42 must stop the lockout pulses until the depression of the advance key and synchronize the lockout pulse to EZR 28. The second scheme, "Machine Paced", 2 to 4 digit keying is very similar to the present mode of operation of the MPLSM in that two to three keystroke entries are used. It differs in that the POSTNET bar code is printed and keystroke data is entered slightly sooner by opening the keyboard earlier with a "Lockout 1" signal on line 17 coupled to I/O Station 28*d* and by using a preview station. The Postal Numeric Encoding Technique (POSTNET) was developed by the Postal Service to provide an optimized bar code system for encoding ZIP code information on letter mail. The technique is characterized by the ability to read and decode the printed bars by state of the art optical readers. The basic elements of printed code are bars and half-bars representing binary "1"'s and "0"'s respectively. These bars are printed in one of two formatting fields, namely, A-field or B-field. A-field identifies 5 digit ZIP code containing 32 bars and 9 digit ZIP code with 52 bars. B-field expands the 5 digit A-field to include 37 additional bars to comprise a 9-digit ZIP code.

Figure 3:
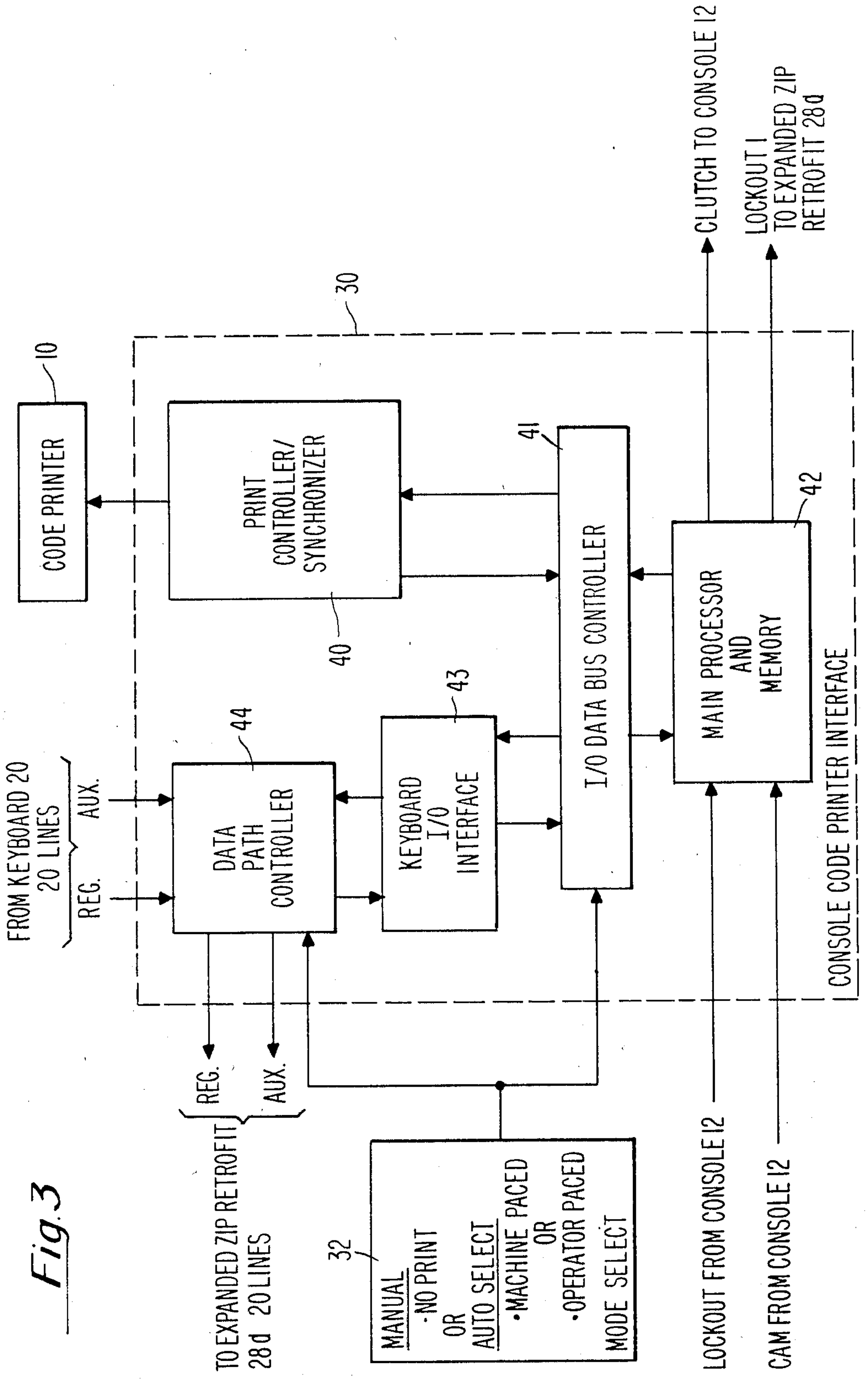
FIG. 3 is a block diagram of the modifications depicted in FIG. 2, involving the console printer.

With further reference to FIG. 3, the operator selects the Mode Select 32 switch to run "Operator Paced" mode. The Main Processor and Memory 42 which is constantly looking at the Mode Select 32 inputs, through the I/O Data Bus Controller 41 now knows which program to run in memory. Also the Mode Select 32 switch sets the Data Path Controller 44 to obtain Keyboard I/O Interface 43 data and sends it to EZR 28*d* by way of twenty signal lines. The Main Processor and Memory 42 now waits for signals from the Keyboard 20 as the operator keys in the ZIP code information. These signals pass through the Data Path Controller 44, Keyboard I/O Interface 43 and are latched into the I/O Data Bus Controller 41, where they are read by the Main Processor 42. The Main Processor and Memory 42 assembles the information and determines the equivalent POSTNET bar code. A "clutch" signal is provided to console 12 via line 11 to start the print cycle. The mail piece 16 in FIG. 1, travelling in the transport path, is sensed by the Mail Piece Detector 44 (FIG. 4) found in Print Controller/Synchronizer 40. The POSTNET bar code is printed on the mail piece as it moves past the Print Head 50 disposed in Code Printer 10. Further downstream, a Bar Code Print Detector 61 situated in Print Controller/Synchronizer 40, checks the print quality to see if proper printing took place. The Main Processor and Memory 42 also transmits the keyed information to the EZR 28*d* through the data path comprising I/O Data Bus Controller 41, Keyboard I/O Interface 43 and Data Path Controller 44. This information enables EZR to sort the mail piece to the proper bin. If the Console Code Printer 10 is not being used and the Mode Select 32 is set to "Manual" (no print), the Data Path Controller 44 allows the keyboard signals to be transmitted directly to EZR I/O Station 28*d* as in the present manner.

Figure 4A:
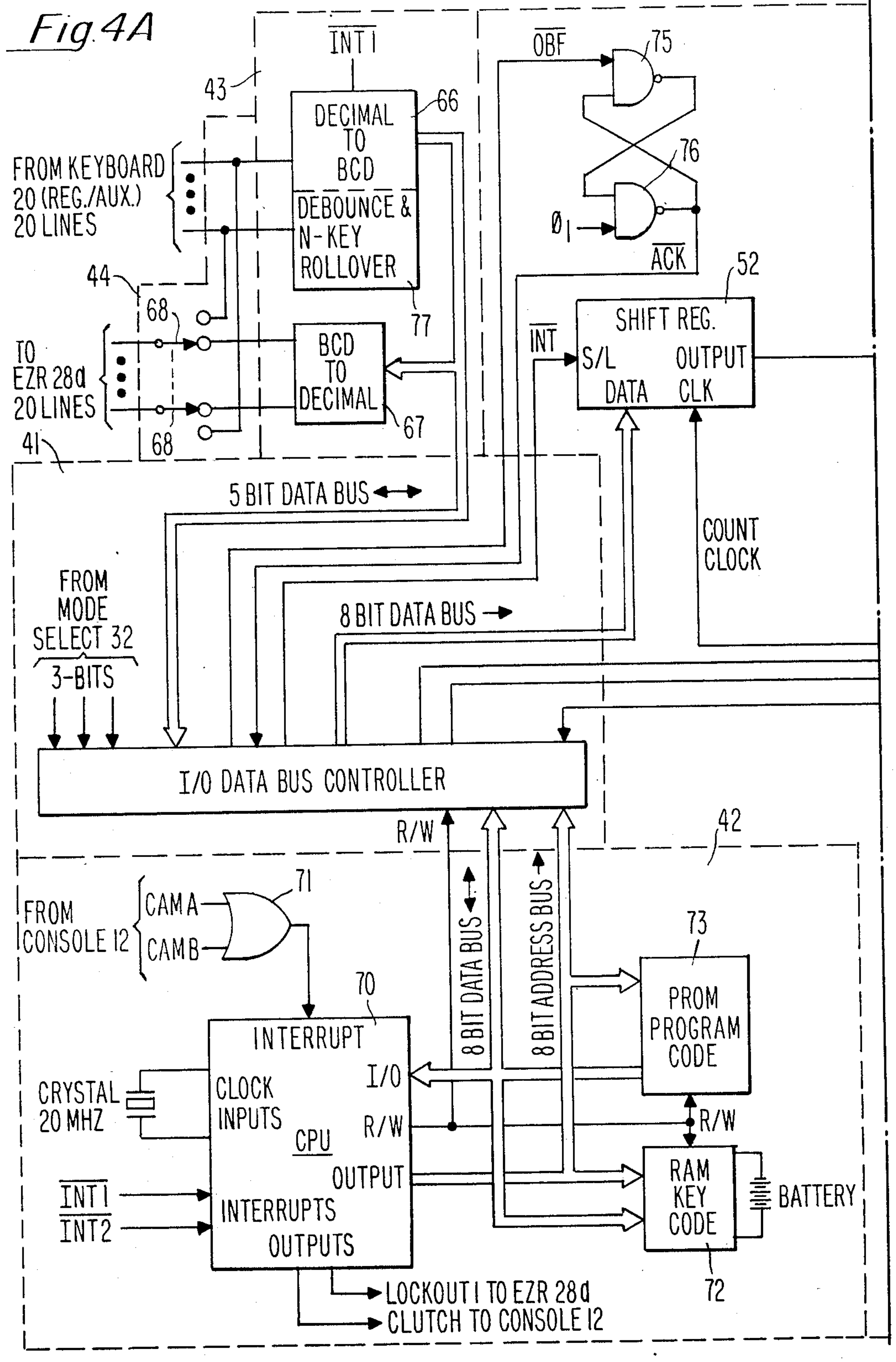
FIG. 4 comprises FIGS. 4A and 4B which together in side-by-side relationship provide an expanded block diagram based upon FIG. 3, and provide more details of the "Console Code Printer Interface".

With reference to FIG. 4, the following provides more detailed information on the Data Path Controller 44, Keyboard I/O Interface 43, I/O Data Bus Controller 41, Main Processor and Memory 42 and Print Controller/Synchronizer 40.

The Data Path Controller 44 is used to interconnect the Console Code Printer interface 30 with Keyboard 20 and EZR 28. Reed relays 68 are provided to physically switch between EZR 28 and Keyboard 20 or EZR 28 and Console Code Printer Interface 30. The Keyboard I/O Interface 43 includes all of the interconnections required to convert keystrokes from Data Path Controller 44 to binary coded decimal (BCD) unit 66 and to provide debounce to filter out noise from the keyboard and N-key rollover protection for simultaneous keying in unit 77. It also converts BCD to Decimal in unit 67 and interfaces to the I/O Data Bus Controller 41 5-bit bidirectional port.

The I/O Data Bus Controller 41 is a programmable interface designed for use with microcomputer systems. Its function is that of a general purpose I/O unit to interface peripheral equipment to the microprocessor system bus. The I/O Data Bus Controller 41 performs three operations: Basic I/O, Strobed Output and Bidirectional Bus. Basic I/O provides simple input and output operations, for example, 3-bit inputs from Mode Select 32 or 2-bit outputs to Counter 59. Strobed Output is a "handshaking" device used to interface with the Shift Register 52. Four signals namely, OBF, ACK, INT and Clock Pulse $\phi 1$ and AND gates 75 and 76 are utilized. When signals INT and OBF go low, INT allows data to be loaded into the Shift Register 52 upon the next clock pulse $\phi 1$; also $\phi 1$ allows the ACK signal to go low and informs the I/O Data Bus Controller 41 that data has to be accepted. The OBF goes high due to the ACK going low. ACK goes high on the next clock pulse $\phi 1$ and in turn pulls INT high. Clock pulse $\phi 1$ then allows data to be shifted out of the Shift Register 52. The third operation, Bidirectional Bus, allows both transmitting and receiving data on a single line such as the interface to Keyboard I/O Interface 43 or 8-bit Data Bus to Main Processor and Memory 42.

The Main Processor and Memory 42 are comprised of three basic blocks, CPU 70, PROM 73 and RAM 72. Communication between blocks and I/O Data Bus Controller 41 is accomplished by an 8-bit Data Bus, 8-bit Address Bus and R/W pulse. The CPU 70, via programs stored in PROM 73, controls synchronization of data from keyboard 20 via Interrupt Signal $\overline{INT1}$ to the CPU 70 and sends more POSTNET data to Shift Register 52 via Interrupt Signal, $\overline{INT2}$. Upon actuation of the advance key from keyboard 20, the "clutch" signal line 11 is sent by the CPU 70 to console 12, synchronizing output data to EZR 28. The clutch signal line 11 is acknowledged by cam interrupt signal line 13 generated by CAM A (operator paced) or CAM B (machine paced) via OR gate 71. Data sent to EZR 28 is latched in by CPU 70 "Lockout 1" pulse line 17 which is also synchronized at the proper time via CAM pulse line 11 and lockout signal line 15 from console 12. CPU 70 also initializes I/O Data Bus Controller 41 and Print Controller/Synchronizer 40. Further, CPU 70 evaluates keyboard data input and provides POSTNET bar code for printing. Timing pulses generated within CPU are produced by a 20 MHz crystal connected directly thereto. Residing in PROM 73 is the program code, which is divided into three sections: Modes of Operation, Program Initialization and Table Lookup. Modes of Operation are selected by Mode Select 32. Program Initialization occurs upon power-up or reset. The Lookup Table cross references POSTNET code for digits 0 to 9 conversion. RAM 72 stores key code information identifying user-programmable keys present on Keyboard 20. Also, RAM 72 is provided with a battery backup circuit to insure integrity of the memory upon power failure. Key code is programmed in via interaction of Keyboard 20, CPU 70, and the software program stored in PROM 73.

The Print Controller/Synchronizer 40 controls and verifies proper printing of A-field, 5 or 9 digit POSTNET printing and B-field, expanded 5 to 9 digit POSTNET printing. Synchronization of POSTNET printing is accomplished by a photocell detector, within Mail Piece Detector 55. When the leading edge of the mail piece passes by the photocell, Mail Piece Detector 55 output line 57 goes low clearing Counter 59 and interrupting CPU 70 via OR gate 53 output $\overline{INT2}$. The trailing edge of the mail piece pulls Mail Piece Detector 55 output line 57 high, identifying the beginning of the print cycle. The start count circuit 58 synchronizes the Mail Piece Detector 55 rising edge with the rising edge of encoder 56. Counter 59 is a binary counter. Required outputs are pulsed at predetermined times depending upon input signals 5/9 and A/B.

With signals A/B and 5/9 set high the counter 59 counts to 32 and stops; if signal 5/9 is low it counts to 52. If printing is required in the B-field signal A/B is set low, the counter 59 generates a signal at count 37 and stops at count 72.

The output from Counter 59 connected to Data Request 54 pulses every eight counts to send an interrupt to CPU 70 through OR gate 53. This requests eight more bits of data be sent to Shift Register 52. Data in Shift Register 52 is shifted by the Counter 59 Count Clock pulse. Also, the $\phi 1$ output enables the acknowledge signal to tell the I/O Data Bus Controller 41 that data has been accepted in Shift Register 52. Code Printer 10 on FIG. 4B is described as follows: Data from the Shift Register 52 arrives at Buffer 51 where the digital signals are converted to high current drive pulses to activate the Print Head 50 for printing. The Print Head is an impact pin printer consisting of 9 pins. If a "0" is shifted out of the Shift Register 52, the bottom 5 pins print a low bar, if a "1", all 9 pins print a high bar. The mail piece, after it has been bar-coded, travels past a photo detector interface to the Bar Code Print Detector 61. The Print Detector 61 measures the print contrast ratio between the background and the bar print to insure that it is readable. The background is read when Counter 59 output "RB" is pulsed allowing a voltage to pass through the Read Background Analog Switch 60 and place the voltage charge on capacitor 63. Next the Counter 59 output "RC" is pulsed when bar print is in front of the Detector 51 and allows this voltage to pass through Read Bar Code Analog Switch 62. The two voltages are compared with A/D Comparator 64. A low level output from Comparator 64 means no problem but if the level therefrom is high when the Counter 59 provides a high window pulse to AND gate 65, the output of the latter will go high, indicating a printing error. The error sensed by CPU 70 indicates a failure which may be caused, for example, by dry print ribbon, necessitating its replacement.

In conclusion, there has been described a printer kit which has particular application in the retrofit of existing letter sorting machines. The ability of such machines to selectively operate in a no-print mode, as at present, or in an automatic print mode, as provided by the present invention, greatly increases the performance and usefulness of such machines.

While there have been disclosed specific design details applicable to a particular machine, the basic principles taught herein may be applied to other similar machines which nevertheless differ somewhat in construction or operation. Changes and modifications of the kit may be required to suit particular requirements. Such variations as are within the skill of the designer, and which do not depart from the true scope and spirit of the invention are intended to be covered by the following claims.

We claim:

1. A printer kit for use with a letter sorting machine having an input console which includes an operator-controlled keyboard for the entry of destination data for each mail piece and an Expanded ZIP Retrofit (EZR) for converting such data into a sort bin designation, comprising in combination:

a printer operatively mounted on said console for printing coded address information on each mail piece;

a mode select unit having operator-actuated switching means for selectively placing said console in a plurality of print and no-print modes;

a console code printer interface coupled between said printer and said EZR, said console code printer interface including a main processor and memory, an I/O data bus controller having an input and an output terminal coupled to said main processor and memory, a data path controller having a plurality of input terminals coupled to said keyboard for receiving said destination data therefrom and a plurality of output terminals coupled to said EZR for providing said last mentioned data thereto, a keyboard I/O interface unit interposed between said data path controller and said I/O data bus controller, said keyboard I/O interface unit having a plurality of input and output terminals for the transmission of data between the last mentioned controllers;

said mode select unit being coupled to said data path controller for causing the latter to send said destination data directly to said EZR for a no-print mode and to said I/O data bus controller via said keyboard I/O interface unit for a print mode, said mode select unit being further coupled to said I/O data bus controller whereby said main processor and memory are conditioned to execute a predetermined program stored in the latter in accordance with the mode select unit; said main processor accessing said destination data in said I/O data bus controller, assembling the same and determining the code equivalent thereto for printing on said mail piece, said main processor and memory further transmitting said keyboard data to said EZR via said data path controller;

said main processor and memory being comprised of a CPU, a PROM, and a RAM:

said PROM storing program code and being coupled in common to said CPU, said I/O data bus controller and said RAM via a bidirectional data bus; said program code comprising modes of console operation selectable in accordance with the switch setting of said mode select unit, program initialization, and table lookup for cross referencing destination data and code to be imprinted on said mail piece;

said CPU being further coupled to said I/O data bus controller, said PROM and said RAM via a unidirectional address bus; said CPU also providing a R/W signal to said PROM, said RAM and said I/O data bus controller, means for applying an interrupt signal to said CPU in response to signals from said console indicative of an operator-paced or machine-paced print mode, said CPU having first and second output terminals coupled respectively to said EZR and said console, said CPU providing a lockout pulse on said first output terminal for synchronizing the destination data transmitted to said EZR via said data path controller, and a clutch signal on said second output terminal for synchronizing the movement of said mail piece in said console with the keying of said destination data;

said RAM storing key code information identifying user-programmable keys present on said keyboard.

2. A printer kit as defined in claim 1 wherein said console code printer interface further includes a print controller/synchronizer, the latter being coupled to said main processor and memory and to said printer, said print controller/synchronizer including means for detecting the presence of said mail piece and initiating the printing of said coded address information thereon at a predetermined time, and further including means for determining the quality of the last mentioned printing.

3. A printer kit as defined in claim 2 wherein said data path controller includes a plurality of ganged switches for selectively providing destination data from said keyboard directly to said EZR in a no-print mode and from said main processor and memory via said keyboard I/O interface to said EZR in a print mode.

4. A printer kit as defined in claim 3 wherein said keyboard I/O interface includes a decimal-to-BCD converter coupled to said keyboard for converting said destination data to BCD format, the latter being applied to said I/O data bus controller for use in said main processor and memory, and further includes a BCD-to-decimal converter for converting the BCD formatted destination data from said main processor and memory to decimal form and for applying the latter to said EZR via said data path controller.

5. A printer kit as defined in claim 4 characterized in that said coded address information is in the format of the POSTNET bar code system.

6. A printer kit as defined in claim 5 wherein said means for detecting the presence of said mail piece and initiating the printing of said coded address information thereon comprises photocell means coupled to a mail piece detector, the latter generating an output pulse in response to the detection of the trailing edge of said mail piece by said photocell means, counter means coupled to said mail piece detector, said output pulse of said mail piece detector clearing said counter means and effecting an interrupt of said CPU, shift register means coupled to said I/O data bus controller and being responsive to said interrupt for receiving bits of input data representative of at least a portion of the destination data for said mail piece, encoder means responsive to the motion within said letter sorting machine for generating a train of clock-type pulses, means interposed between said encoder means and said counter means for applying said last mentioned pulses to said counter means, said counter means having a clock count output terminal coupled to said shift register means whereby said input data stored therein is shifted, out bit-by-bit in response to said clock-type pulses, said counter means initiating additional CPU interrupt signals and resultant loading of said shift register means in response to the reception of predetermined counts of said clock-type pulses, said counter means having set count input terminals coupled to said I/O data bus controller for limiting the total number of clock-type pulses which will be accepted thereby in accordance with the ZIP digit count and field of the destination data, said printer being coupled to said shift register means and being responsive to the data bits shifted out of the latter for printing equivalent bar code indicia on said mail piece.

7. A printer kit as defined in claim 6 wherein said means for determining the quality of said printing includes a read photo detector coupled to a bar code detector, the latter generating an output signal in response to said photo detector, a pair of analog switches each having an input terminal coupled in common to said photo detector to receive said output signal, said counter means having a pair of output terminals coupled respectively to said analog switches, said counter means generating respective enable signals on said last mentioned output terminals in response to the occurrence of predetermined counts of said encoder clock-like pulses, said analog switches providing output signal levels indicative respectively of the background and printed bar areas of said mail piece in response to said enable signals, means for comparing the amplitudes of said output signal levels and for generating an error signal in response to substantially like amplitudes, the latter being indicative of insufficient contrast between the printed bar and its background.

8. A printer kit as defined in claim 7 wherein said analog switch for providing an output signal level indicative of the background area associated with a printed bar area includes capacitor means for storing said last mentioned signal level in order that it might be compared with a subsequent signal level indicative of said printed bar as generated by the other of said pair of analog switches.

9. A printer kit as defined in claim 8 wherein said keyboard of said input console is comprised of a regular section and an auxiliary section.

10. A printer kit as defined in claim 9 wherein said printer comprises a print head of the impact pin printer-type and buffer means interposed between said shift register means and said print head for converting the data shifted out of the former to high current drive pulses for actuating the latter.

* * * * *